(12) United States Patent
Dembicks

(10) Patent No.: US 7,032,345 B2
(45) Date of Patent: Apr. 25, 2006

(54) CRIMP

(75) Inventor: Tyler J. Dembicks, Raleigh, NC (US)

(73) Assignee: North State Tackle, NC (US)

(*) Notice: Subject to any disclaimer, the term of this patent is extended or adjusted under 35 U.S.C. 154(b) by 0 days.

(21) Appl. No.: 10/680,269

(22) Filed: Oct. 7, 2003

(65) Prior Publication Data

US 2005/0071957 A1    Apr. 7, 2005

(51) Int. Cl.
*A01K 91/047*     (2006.01)
*F16G 11/00*      (2006.01)

(52) U.S. Cl. ............ 43/44.91; 43/43.1; 43/44.89; 43/44.9; 24/703.1

(58) Field of Classification Search ........... 24/136 R, 24/703.1, 129 R, 703.6, 703.2, 129 W; 403/279, 403/282, 274; 29/505, 514, 525.05; 174/84 R, 174/84 C, 80 R, 88 L; 43/44.83, 44.87, 43/44.89, 44.91, 44.9
See application file for complete search history.

(56) References Cited

U.S. PATENT DOCUMENTS

| 291,693 | A | * | 1/1884 | Cole ............... 403/284 |
| 3,200,190 | A | * | 8/1965 | Forney, Jr. ........ 174/84 C |
| 3,916,517 | A | * | 11/1975 | Luongo ............ 174/84 C |
| 3,973,824 | A | * | 8/1976 | Chor ............... 174/84 C |
| 5,022,178 | A | * | 6/1991 | Carlson ............ 43/44.82 |
| 5,103,068 | A | * | 4/1992 | Schrader .......... 403/391 |
| 5,162,615 | A | * | 11/1992 | Schrader et al. .... 403/275 |

* cited by examiner

*Primary Examiner*—Robert J. Sandy
(74) *Attorney, Agent, or Firm*—Akerman Senterfitt

(57) ABSTRACT

A crimp usable in attaching terminal tackle, such as a hook, to a fishing line. The crimp may include a preattached pin extending from the crimp. The pin may be used to facilitate attachment of a baitfish to the hook. In at least one embodiment, the pin may be used to attached a baitfish to a hook by inserting the pin through a lower and upper jaw of a baitfish.

30 Claims, 5 Drawing Sheets

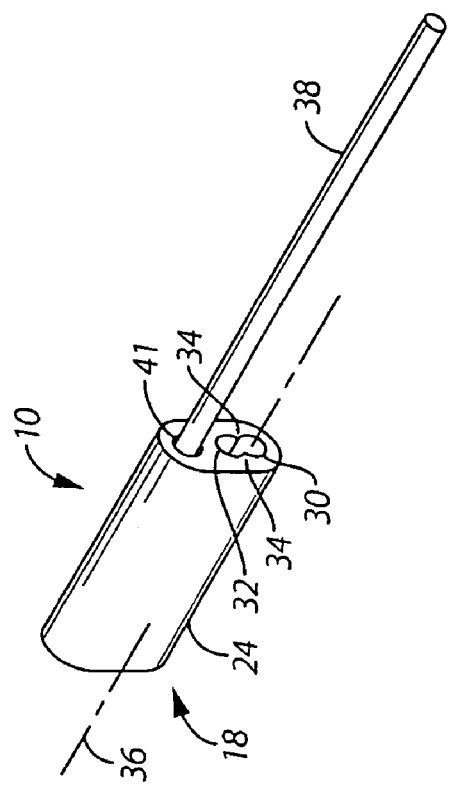
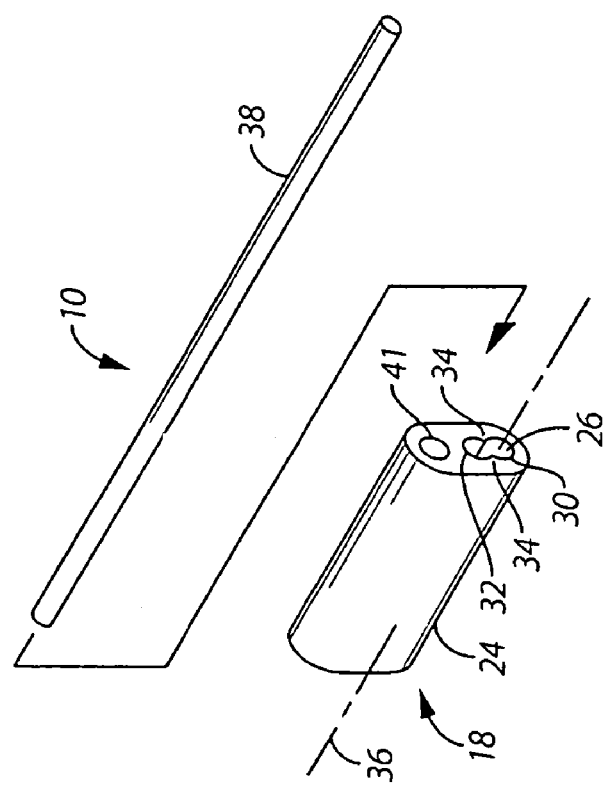

CRIMP

FIELD OF THE INVENTION

This invention is directed generally to crimps, and more particularly, to crimps usable to attach a hook to a fishing line in fishing applications.

BACKGROUND

Terminal tackle, such as plugs, skirts, hooks, swivels, and the like are often attached to fishing line using a crimp. Crimps are typically used with fishing line that is too large to form adequate knots. For instance, crimps are often used with 60 pound test monofilament and larger. Crimps are used to form a loop in which a hook may be attached. Often times, crimps are used to attach hooks to a leader. In at least one application, crimps may be used to attach a hook to leader, and to hold a thin wire usable to attach a baitfish, such as a ballyhoo, to the hook. Typically, a hook may be attached to a line by passing a line through a cavity in the crimp, through the eye of a hook, and back through the cavity in the crimp. A thin wire, as shown in FIGS. 1–3, may be inserted into the cavity before the crimp is tightened. The thin wire is typically used to hold ballyhoo, which is a baitfish, on a hook in a manner allowing the ballyhoo to be trolled behind a boat so that the ballyhoo swims in the water and does not spin. It is very important that the ballyhoo swim and not spin. It is rare that a fish will strike a spinning ballyhoo. Rather, pelagic game fish are more apt to strike a swimming ballyhoo.

A ballyhoo is attached to a hook by inserting the hook through a gill cavity and out the belly of the ballyhoo. The eye of the hook may be positioned in the gill cavity of the ballyhoo. The pin may then be inserted through the lower and upper jaws of the ballyhoo from the bottom side of the ballyhoo. The head of the ballyhoo may be attached to the hook and line by wrapping a thin piece of wire around the gill plates, through the eye sockets, and around the mouth of the ballyhoo. The thin piece of wire may also be tightened near the pin so that the ballyhoo cannot slip down the shank of the hook. This configuration prevents a ballyhoo from sliding down the shaft of the hook while being trolled behind a boat. If the ballyhoo slides down the shaft of the hook, the ballyhoo spins, which often causes undesirable line twist and, more importantly, fails to yield a fish strike from, for instance, a sailfish.

Attaching the pin to the crimp is easier said than done. Crimps typically are produced in different sizes for each size monofilament. The cavities in the crimps are sized to be only slightly larger than the monofilament to be passed through the cavities. Thus, there is often not enough space to insert the thin wire into the crimp. In addition, this task is difficult to accomplish while at sea. If a mate is forced to rig baits while in heavy seas because all of the prerigged baits have been used, trying to feed a pin into the cavity in which the monofilament has been inserted can become a time consuming, frustrating task. Thus, a need exists for a more time efficient device for attaching a pin to a crimp.

SUMMARY OF THE INVENTION

This invention relates to a crimp usable to attach terminal tackle to a line for fishing applications, whereby the crimp may have at least one pin for facilitating attachment of a baitfish to the line. In at least one embodiment, the crimp may be used to form a loop attaching a hook to a line and to facilitate attaching a ballyhoo to the hook so that the ballyhoo is generally parallel with the line, thereby enabling the ballyhoo to swim when trolled behind a boat, rather than spin.

In at least one embodiment, the crimp may be formed from a body having at least one cavity extending through the body and adapted to receive at least two diameters of a line. The crimp may also include one or more pins extending from the body. The pin may extend from the body generally parallel to a longitudinal axis of the crimp. The pin may extend a sufficient length to be bent to attach a baitfish to a hook or other type of terminal tackle. In at least one embodiment, the pin may be inserted into a pin cavity in the body.

The crimp may be used to attach one or more baitfish to terminal tackle, such as, a hook. For instance, the crimp may be used to attach a hook to a line and may be used to attach a ballyhoo to the hook. More specifically, a line may be inserted through the crimp, passed through an eye of a hook, and passed back through the crimp. The crimp may then be tightened to form a loop attaching the hook to the line. The hook may be inserted through the gill cavity and the belly of the ballyhoo. The pin may then be bent and inserted through the lower and upper jaws of the ballyhoo. Thin bendable wire may be used to attach the head of the ballyhoo to the hook and to hold the mouth of the ballyhoo shut while trolling the ballyhoo behind a boat.

These and other embodiments are described in more detail below.

BRIEF DESCRIPTION OF THE DRAWINGS

The accompanying drawings, which are incorporated in and form a part of the specification, illustrate embodiments of the presently disclosed invention and, together with the description, disclose the principles of the invention.

FIG. 4 is an exploded perspective view of a crimp having aspects of this invention.

FIG. 5 is a perspective view of a crimp having aspects of this invention.

DETAILED DESCRIPTION OF THE INVENTION

Figure 3:
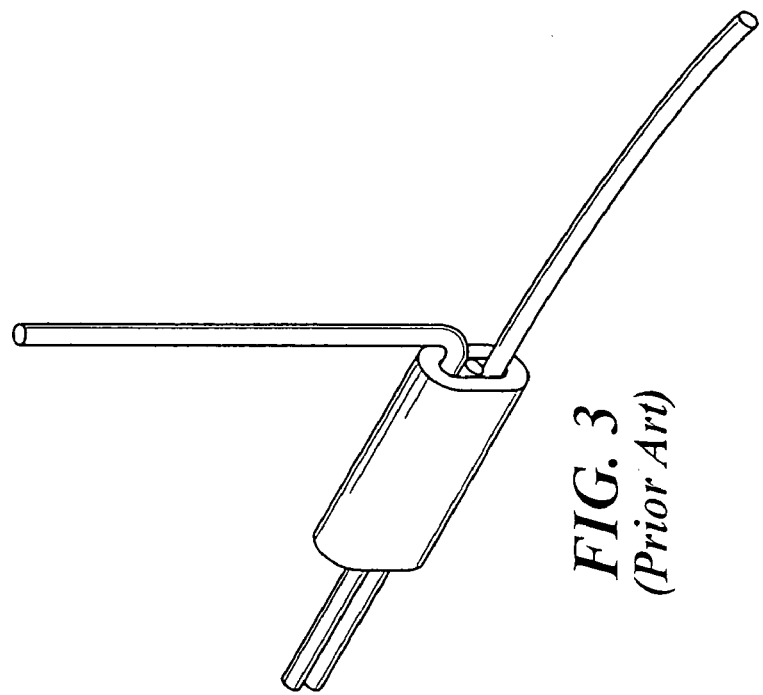
FIG. 3 is a perspective view of a crimp of the prior art having a pin inserted in to a single cavity in the crimp.
Figure 1:
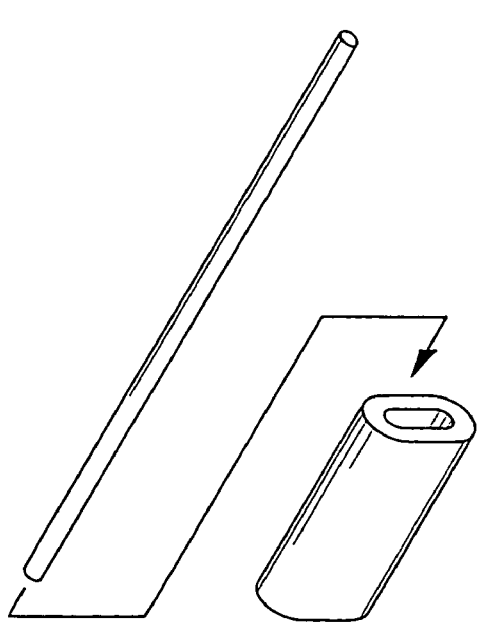
FIG. 1 is a perspective view of a crimp of the prior art.
Figure 2:
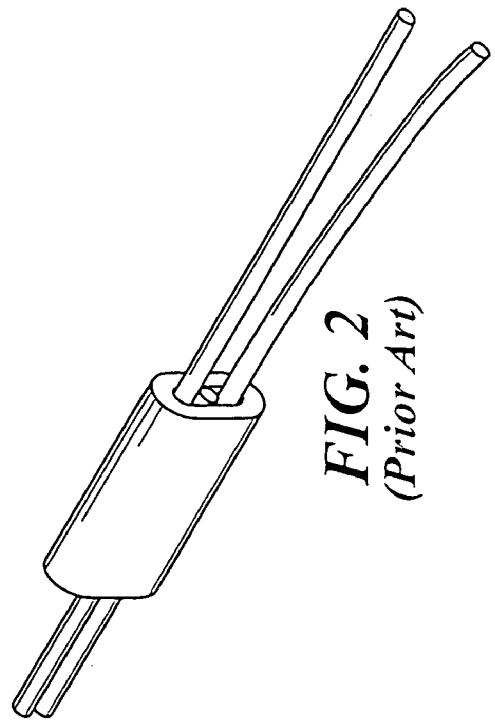
FIG. 2 is a perspective view of a crimp of the prior art having monofilament inserted into the crimp.
Figure 6:
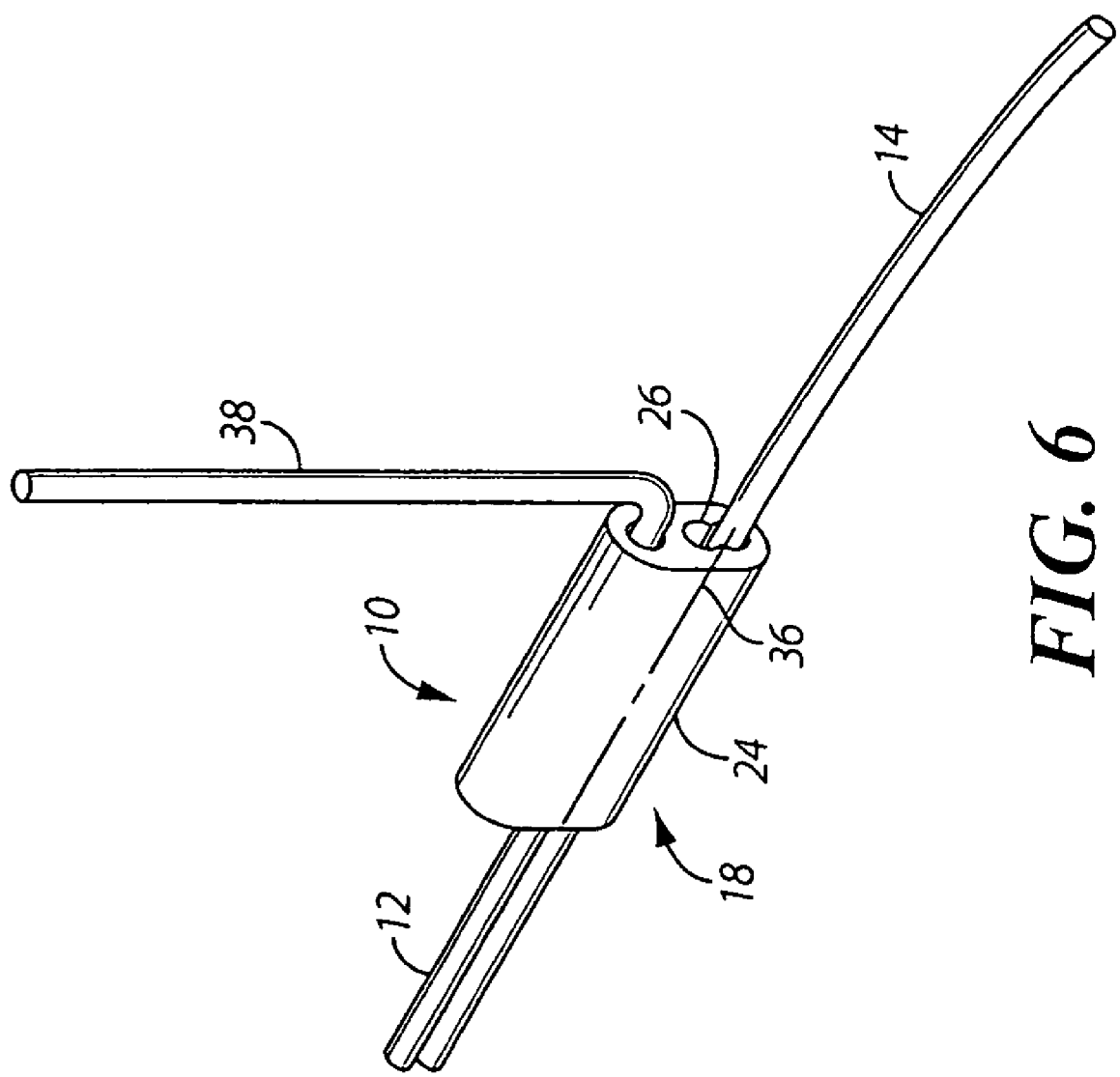
FIG. 6 is a perspective view of a crimp of this invention having line inserted into the cavity in the crimp.

As shown in FIGS. 1–9, this invention is directed to a crimp 10 usable to form a loop 12 in a line 14. In at least one application, as shown in FIGS. 6–9, the crimp 10 may be used to attach terminal tackle 16 to a line 14 in fishing applications. Terminal tackle may be, but is not limited to, a hook, a fishing lure, or other appropriate object, and the line 14 may be, but is not limited to a monofilament, a multifilament, a cable, a wire line, a braided line, or other appropriate usable as fishing line. In general, the crimp 10 may include a connector 18 for facilitating attachment of a baitfish 50 to a hook 20. In at least one embodiment, the connector 18 may be adapted to facilitate attachment of a ballyhoo 50 to hook 20 so that the ballyhoo 50 is relatively parallel with the line 14 and a shank 22 of the hook 20.

In at least one embodiment, as shown in FIGS. 4 and 5, the crimp 10 is formed from a body 24 having at least one cavity 26 extending through the body 24 and adapted to receive at least two diameters of a line 14. The cavity 26 may be formed such that a line 14 may be inserted through the cavity 26, and an end 28 of the line 14 may be passed through the cavity 26 in an opposite direction, thereby forming a loop 12. The cavity 26 may be formed from at least a first side wall 30 and a second side wall 32. In at least one embodiment, the first and second side walls 30, 32 may include one or more protrusions 34 extending from the sidewalls 30, 32 that act as a guide for the line 14 passing through the cavity 26. The cavity 26 may be sized to receive line 14 having a generally cylindrical cross-section. In yet another embodiment, the cavity 26 may be formed from at least two separate cavities having generally cylindrical cross-sections, as shown in FIGS. 4 and 5, extending through the body 24. The cavity 26 may be sized to be slightly larger than a line 14 to be passed through the cavity 26. Thus, the crimp 10 may be manufactured having cavities 26 with different sizes, which may correspond to different diameter lines 14, such as those available in the marketplace. The cavities 26 may be sized to receive line 14 such as, but not limited to, 60 lb. test monofilament, 80 lb. test monofilament, 100 lb. test monofilament, and other sizes and other materials. In at least one embodiment, the cavities 26 may be generally parallel with a longitudinal axis 36 of the crimp 10. The body 24 may be formed of any material capable of deforming when placed in the jaws of a crimping tool. Preferably, the body 24 may be formed of corrosion resistant, pliable materials such as, but not limited to, aluminum, bronze, stainless steel or other appropriate materials.

The body 24 may also include one or more pins 38 extending from the body 24. The pin 38 may be a wire. The pin 38 may be adapted to facilitate attachment of a baitfish 50, such as, but not limited to, a ballyhoo 50, to a hook 20. The pin 38 may be attached to the body 24 during the process of forming the body 24 or may be attached to the body 24 by inserting the pin 38 into a pin cavity 41 during the manufacturing process or at other times. The pin 38 may be formed from any material having sufficient rigidity to attach a baitfish 50 to the hook 20, yet be flexible to enable the pin 38 to be bent at approximately 90 degrees to the longitudinal axis 38 of the crimp 10. In at least one embodiment, the pin 38 may be formed from copper, stainless steel, or other corrosive resistant materials.

In at least one embodiment, the body 24 may have a length between about 0.25 of an inch and about 1.0 inch, and may preferably be between about 0.25 of an inch and about 0.50 of an inch or about 0.35 of an inch. However, the body 24 is not limited to these lengths, but may be formed from other appropriate lengths as well. The pin 38 may have a diameter of between about 0.015 of an inch and about 0.045 of an inch, and may preferably be about 0.03 of an inch. However, the pin 38 is not limited to these diameters, but may be formed from other appropriate diameters as well. The pin 38 may also extend from the body 24 between about 0.5 of an inch and about one inch, and may preferably be about 0.75 of an inch. However, the pin 38 is not limited to these lengths, but may be formed from other appropriate lengths as well.

Figure 7:
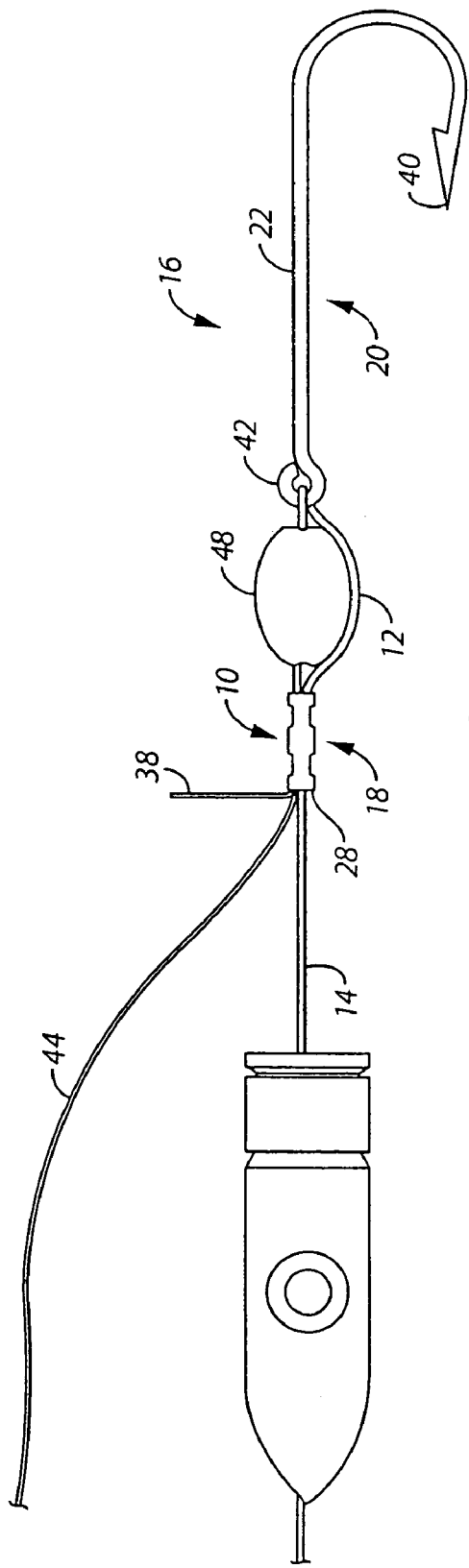
FIG. 7 is a fishing rig with a crimp of this invention having a wire to attach baitfish to a hook.
Figure 8:
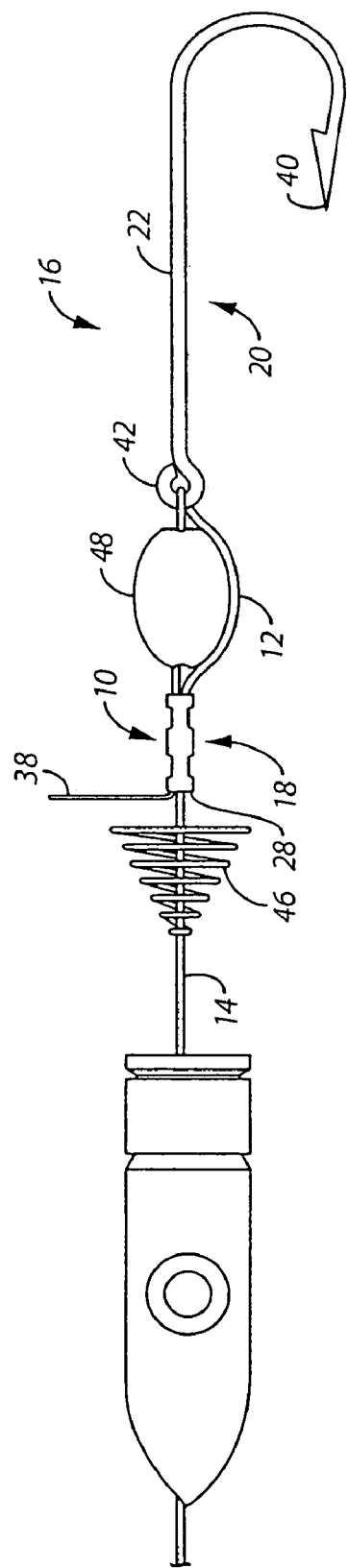
FIG. 8 is a fishing rig with a crimp of this invention having a spring to attach baitfish to a hook.

The crimp 10 may be used to form a fishing rig, as shown in FIGS. 6–9, by first passing a line 14 through a cavity 26 in the crimp 10, through an eye 42 of a hook 20, and back through the crimp 10. In at least one embodiment, as shown in FIGS. 7 and 8, the line 14 may first be passed through a weight 48 before being passed through an eye 42 of a hook 20. The weight 48 may be between about ½ of an ounce and about 2 ounces and used to keep a baitfish 50 attached to the hook 20 under the surface of the water while being trolled behind a boat.

Figure 9:
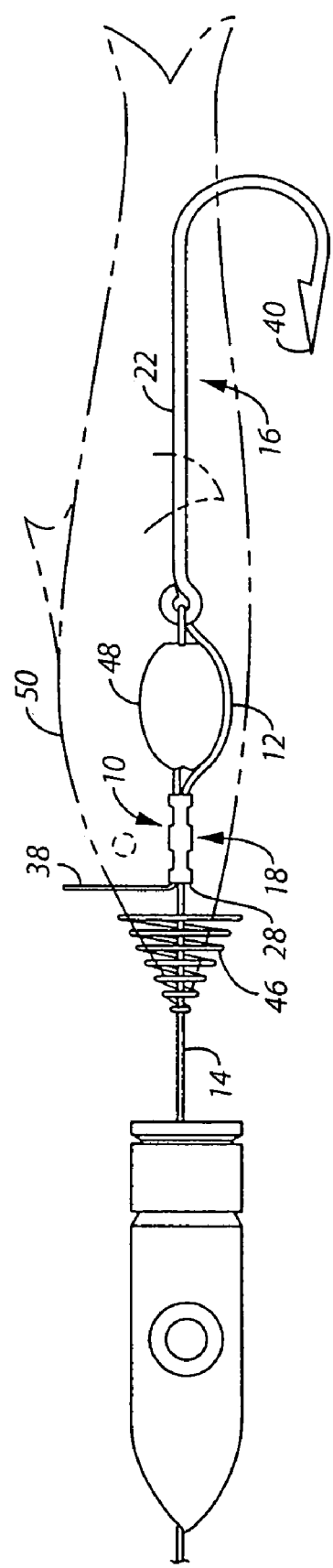
FIG. 9 is the fishing rig shown in FIG. 8 with a ballyhoo attached to the hook.

As previously mentioned, the crimp 10 may be used to hold a baitfish 50 to a line 14, as shown in FIG. 9. For example, the crimp 10 may be used to hold a ballyhoo 50 to a hook in a streamline fashion so that the ballyhoo 50 swims through the water and occasionally breaks the surface of the water while being trolled behind a boat without spinning. In embodiments where a weight is used, the ballyhoo generally remains below the water surface while being trolled. The ballyhoo 50 may be first attached to the hook 20 by inserting the point 40 of the hook 20 under the gills of the ballyhoo 50, into the intestinal cavity, and through the belly. The eye 42 of the hook 20 may be positioned in the gill cavity of the ballyhoo 50. The pin 38 may be bent to be generally orthogonal to the body 24 of the crimp 10. The pin 38 may then be inserted through the lower jaw and upper jaw of the ballyhoo 50. In this position, the pin 38 prevents the ballyhoo 50 from sliding down the shank 22 of the hook 20. The ballyhoo 50 may be held in this position by wrapping a thin piece of metal 44, such as, but not limited to, copper wire, multiple times around the gills and nose of the ballyhoo 50. This small diameter wire 44 attaches the head of the ballyhoo 50 to the line 14 and prevents the ballyhoo 50 from being pulled off the hook 20 by drag from the water through which the ballyhoo 50 is pulled. In other embodiments, a spring 46 may be used to hold the ballyhoo 50 in place.

The foregoing is provided for purposes of illustrating, explaining, and describing embodiments of this invention. Modifications and adaptations to these embodiments will be apparent to those skilled in the art and may be made without departing from the scope or spirit of this invention.

I claim:

1. A fishing line crimp, comprising:
   a body having at least one fishing line receiving cavity extending through the body and adapted to receive at least two diameters of the fishing line; and
   at least one pin cavity receiving at least one pin, wherein the at least one pin extends from the body generally along a longitudinal axis of the body and is bent transversely to the longitudinal axis of the body to assist in the attachment of a baitfish to a hook positioned in close proximity to the crimp.

2. The crimp of claim 1, wherein the at least one fishing line receiving cavity extending through the body is formed from two opposing sidewalls shaped to receive two diameters of a fishing line having a substantially cylindrical cross-section.

3. The crimp of claim 2, wherein each of the two opposing sidewalls comprise at least one protrusion for positioning a generally cylindrical fishing line in the at least one fishing line receiving cavity.

4. The crimp of claim 1, wherein the at least one fishing line receiving cavity comprises two cavities having substantially cylindrical cross-sections.

5. The crimp of claim 1, wherein the at least one pin has a diameter between about 0.015 of an inch and about 0.045 of an inch.

6. The crimp of claim 5, wherein the at least one pin has a diameter of about 0.03 of an inch.

7. The crimp of claim 1, wherein the at least one pin extends from the crimp between about 0.5 of an inch and about one inch.

8. The crimp of claim 7, wherein the at least one pin extends from the crimp about 0.75 of an inch.

9. The crimp of claim 1, wherein the body has a length between about 0.25 of an inch and 1.0 inch.

10. The crimp of claim 1, wherein the body has a length of about 0.35 of an inch.

11. The crimp of claim 1, wherein the body comprises at least one of aluminum, bronze and stainless steel.

12. The crimp of claim 1, wherein the at least one pin comprises at least one of stainless steel and copper.

13. A fishing line crimp, comprising:
a body having at least one fishing line receiving cavity extending through the body, wherein the at least one fishing line receiving cavity is formed from at least two opposing sidewalls shaped to receive at least two diameters of the fishing line;
at least one pin cavity adapted to receive at least one pin; and
the at least one pin positioned in the at least one pin cavity and extending from the body, wherein the at least one pin extends from the body generally along a longitudinal axis of the body and is bent transversely to the longitudinal axis of the body to assist in the attachment of a baitfish to a hook positioned in close proximity to the crimp.

14. The crimp of claim 13, wherein each of the two opposing sidewalls comprise at least one protrusion for positioning the generally cylindrical fishing line in the at least one fishing line receiving cavity.

15. The crimp of claim 13, wherein the at least one fishing line receiving cavity comprises two fishing line receiving cavities having substantially cylindrical cross-sections.

16. The crimp of claim 13, wherein the at least one pin has a diameter between about 0.015 of an inch and about 0.045 of an inch.

17. The crimp of claim 16, wherein the at least one pin has a diameter of about 0.03 of an inch.

18. The crimp of claim 13, wherein the at least one pin extends from the crimp between about 0.5 of an inch and about one inch.

19. The crimp of claim 18, wherein the at least one pin extends from the crimp about 0.75 of an inch.

20. The crimp of claim 13, wherein the body has a length between about 0.25 of an inch and 1.0 inch.

21. The crimp of claim 13, wherein the body has a length of about 0.35 of an inch.

22. The crimp of claim 13, wherein the body comprises at least one of aluminum, bronze and stainless steel.

23. The crimp of claim 13, wherein the at least one pin comprises at least one of copper and stainless steel.

24. A fishing line crimp comprising:
a body having at least one fishing line receiving cavity extending through the body, wherein the at least one fishing line receiving cavity is formed from at least two opposing sidewalls shaped to receive at least two diameters of the fishing line; and
at least one pin positioned in a pin cavity and extending from the body generally along a longitudinal axis of the body and bent transversely to the longitudinal axis of the body to assist in the attachment of a baitfish to a hook positioned in close proximity to the crimp.

25. The crimp of claim 24, wherein the at least one fishing line receiving cavity extending through the body comprises two opposing sidewalls shaped to receive two diameters of a line having a substantially cylindrical cross-section.

26. The crimp of claim 25, wherein each of the two opposing sidewalls comprise at least one protrusion for positioning a generally cylindrical line in the at least one fishing line receiving cavity.

27. The crimp of claim 24, wherein the at least one fishing line receiving cavity comprises two fishing line receiving cavities having substantially cylindrical cross-sections.

28. The crimp of claim 24, wherein the body has a length between about 0.25 of an inch and 1.0 inch.

29. The crimp of claim 24, wherein the body has a length of about 0.35 of an inch.

30. The crimp of claim 24, wherein the body comprises at least one of aluminum, bronze and stainless steel.

* * * * *